C. E. SCHAFER.
COVER RETAINER.
APPLICATION FILED JUNE 26, 1919.
1,348,963. Patented Aug. 10, 1920.
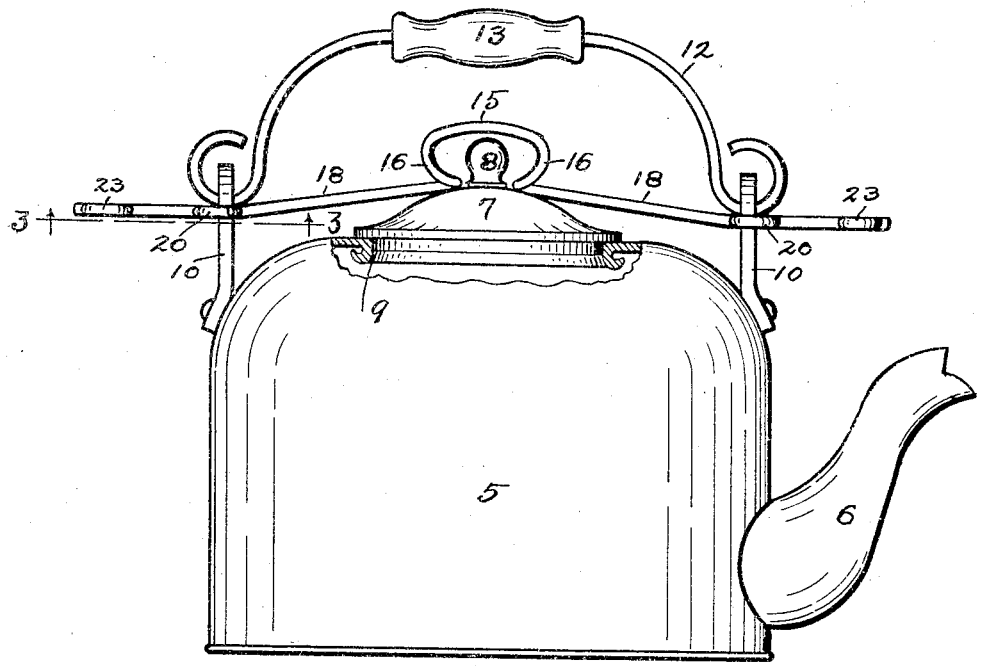
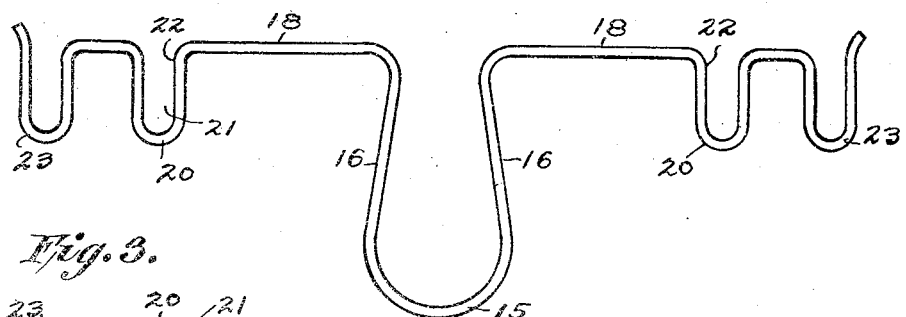
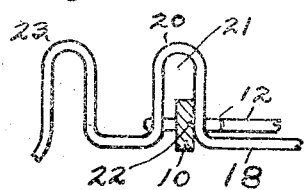
Inventor.
Christian E. Schafer
By
his Attorney.

UNITED STATES PATENT OFFICE.

CHRISTIAN E. SCHAFER, OF EAST CLEVELAND, OHIO.

COVER-RETAINER.

1,348,963.   Specification of Letters Patent.   Patented Aug. 10, 1920.

Application filed June 26, 1919. Serial No. 306,940.

*To all whom it may concern:*

Be it known that I, CHRISTIAN E. SCHAFER, a citizen of the United States, residing at East Cleveland, in the county of Cuyahoga and State of Ohio, have invented a new and useful Cover-Retainer, of which the following is a specification.

This invention relates to an improved cover-retainer for preventing a removable cover from falling or displacement from its closing position on a kettle or receptacle having a bail attached to ears on the body of the receptacle.

The primary object of this invention is to produce a simple, inexpensive and reliable cover-retainer for a kettle or receptacle of the character indicated.

Another object is to render said cover-retainer readily applicable to and removable from the receptacle.

Another object is to render the cover-retainer applicable to more than one size of receptacle.

Another object is to form the cover-retainer of a single piece of wire.

With these objects in view, and to attain any other object hereinafter appearing, this invention consists in certain features of construction, and combinations and relative arrangements of parts hereinafter described in this specification, pointed out in the claims, and illustrated in the accompanying drawings.

In said drawings, Figure 1 is a side view, partly in section, of a hot water kettle provided with a cover-retainer embodying my invention. Fig. 2 is a top plan of my improved cover-retainer detached. Fig. 3 is a horizontal section taken along the line 3—3, Fig. 1, looking upwardly.

Referring to Fig. 1 of said drawings, 5 indicates the body of the kettle or receptacle, which body is provided at one side with a spout 6 at which liquid may be poured from the receptacle. Said body also has a cover 7 which is provided at its top with a central knob 8 and forms a closure for the usual liquid-receiving opening 9 formed in and centrally of the top of said body.

The body 5 has two ears 10 formed at the top of the spout-carrying side and opposite side respectively of said body and facing each other. The ears 10 are therefore substantially parallel and spaced substantially equidistantly from the cover 7 which is placed centrally between said ears, and 12 indicates a bail which is provided with a handle 13 and carried by said ears in the usual manner.

My improved cover-retainer comprises a resilient handle 15 which is U-shaped in plan and forms the central portion of the cover-retainer. The side portions 16 of the handle 15 are resilient and spaced laterally at the inner end of the handle, and the handle has the dimensions required to permit the location of the knob 8 of the cover 7 within the space between the inner ends of said portions of the handle when the cover-retainer has been applied, as shown in Fig. 1, in which said portions of the handle are arranged at opposite sides respectively of and spaced from said knob. Preferably the side portions 16 of the handle 15 extend upwardly in the direction of the outer end of the handle to form an adequate space between said handle and the cover 7, so that said handle may be taken hold of and manipulated without liability of the handle-grasping hand coming in contact with said cover or with the receptacle-body 5.

My improved cover-retainer also comprises two resilient arms 18 arranged at opposite sides respectively of the handle 15. The arms 18 are substantially in line endwise at the inner end of the handle and extend laterally of and outwardly from the inner lower end of opposite side portions 16 respectively of the handle. In other words, each side portion 16 of the handle 15 terminates at the inner end of the handle in a laterally and outwardly extending resilient arm 18. The handle 15 and the arms 18 are preferably formed of a single piece of spring wire, and as the side portions 16 of the handle are resilient obviously any manipulation of said portions of the handle for the purpose of somewhat moving the arms 18 endwise and toward each other, as required to reduce the distance between said arms, is against the action of the resiliency of said portions of the handle.

It will be observed that in Fig. 1, which shows my improved cover-retainer applied to a kettle or receptacle, the cover 7 is shown engaged at its outer side by the cover-retainer at the inner end of the handle 15, and each arm 18 is shown in Fig. 1 as extending outwardly from said cover toward the adjacent bail-carrying ear 10. The outer portion of each arm 18 is shown offset, as at 20, in the direction in which the handle 15 extends from said arm. Each offset portion 20 is U-shaped in plan and, when the cover-retainer has been applied to a receptacle of the type and size shown in Fig. 1, embraces the adjacent bail-carrying ear 10, as shown more clearly in Fig. 3, and is arranged below the adjacent end portion of the bail 12, as shown in Fig. 1. In applying the cover-retainer the arms 18 are somewhat pressed downwardly against the action of the resiliency of the arms by the end portions of the bail 12, so that said arms, upon the application of the cover-retainer, as shown in Fig. 1, press against the downwardly facing surfaces of said portions of the bail.

Preferably the relative arrangement of the parts is such that the offset portions 20 of the arms 18 are substantially equidistant from the handle 15 and spaced such a distance apart that the space 21 internally of the offset portion 20 of one of said arms and the corresponding space internally of the offset portion 20 of the other of said arms are farther apart than the inwardly facing and opposing faces of the bail-carrying ears 10, and the side portions 16 of the handle 15 are somewhat pressed toward each other preparatory to the application of the cover-retainer so as to permit said ears to be embraced by said offset portions of said arms, and so that, upon said application of the cover-retainer, said offset portions will somewhat press against said faces of said ears. It will be observed therefore that the U-shaped offset portions 20 form shoulders 22, that each shoulder 22 faces in the direction of the outer end of the arm 18 on which it is formed, and that the shoulder 22 formed by the offset portion 20 of one arm 18 and the shoulder 22 formed by the offset portion 20 of the other arm 18 are substantially equidistant from the handle 15 and somewhat farther apart than the bail-carrying ears 10 and adapted to be arranged between and to press against said ears upon the application of the cover-retainer.

By the construction hereinbefore described it will be observed that the arms 18 are adapted to extend over and into close proximity to the cover 7 and into engagement with the bail-carrying ears 10 and end portions of the bail 12 upon the application of the cover-retainer, as shown in Fig. 1, and that said cover-retainer comprises a resilient handle-forming portion connecting said arms together at their inner ends.

Preferably each arm 18 is also provided with another offset portion 23 which is substantially the same in contour as and spaced outwardly from the offset portion 20 of said arm. Obviously the offset portions 23 of the arms 18 are for use in connection with a receptacle having its bail-carrying ears spaced farther apart than the bail-carrying ears of the receptacle shown in Fig. 1.

What I claim is—

1. The combination, with a receptacle the body of which is provided at one side with a spout and has two ears formed at the top of the spout-carrying side and opposite side respectively of the body and facing each other and also has an opening formed at the top of the body centrally between said ears, a bail carried by said ears, and a cover forming a closure for and removable from said opening, of a cover-retainer engaging said cover and comprising two arms which are substantially in line and spaced endwise and extend from over the cover to said ears, said cover-retainer also comprising a handle-forming portion connecting said arms together at their inner ends, and said arms having offset portions embracing said ears under the end portions of the bail.

2. The combination, with a receptacle the body of which is provided at one side with a spout and has two ears formed at the top of the spout-carrying side and opposite side respectively of the body and facing each other and also has an opening formed at the top of the body centrally between said ears, a bail carried by said ears, and a cover forming a closure for and removable from said opening, of a cover-retainer comprising two resilient arms which extend from over the cover to opposite ears respectively and are spaced endwise and relatively movable to reduce the space between them, said cover-retainer also comprising a handle which is arranged adjacent the inner ends of said arms and has resilient means acting to retain said arms in their outer and normal position, and each arm having a shoulder which in said position of the arms presses against the inner face of the adjacent ear.

3. The combination, with a receptacle the body of which is provided at one side with a spout and has two ears formed at the top of the spout-carrying side and opposite side respectively of the body and facing each other and also has an opening formed at the top of the body centrally between said ears, a bail carried by said ears, and a cover forming a closure for and removable from said opening, of a cover-retainer comprising a handle which is U-shaped in plan and arranged adjacent the cover and has resilient side portions spaced laterally at the inner end of the handle, said cover-retainer engaging the cover at the inner end of the handle and also comprising two resilient arms which extend laterally of and outwardly from opposite side portions respectively of the handle, and said arms having portions which are offset in the direction in which the handle extends from the arms and embrace the aforesaid ears under the end portions of the bail.

In testimony whereof, I sign the foregoing specification, in the presence of two witnesses.

CHRISTIAN E. SCHAFER.

Witnesses:
W. W. MASSEY,
WILLIS W. HALE.